Figure 4:
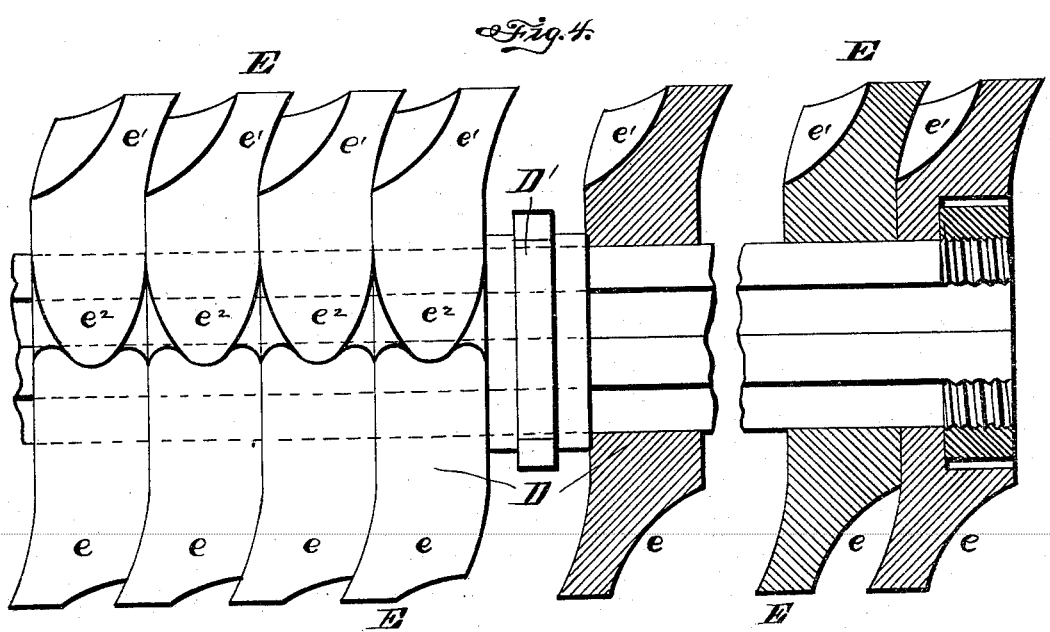

(No Model.) 2 Sheets—Sheet 1.
E. S. & W. A. McKINLAY.
MINING MACHINE.
No. 604,192. Patented May 17, 1898.
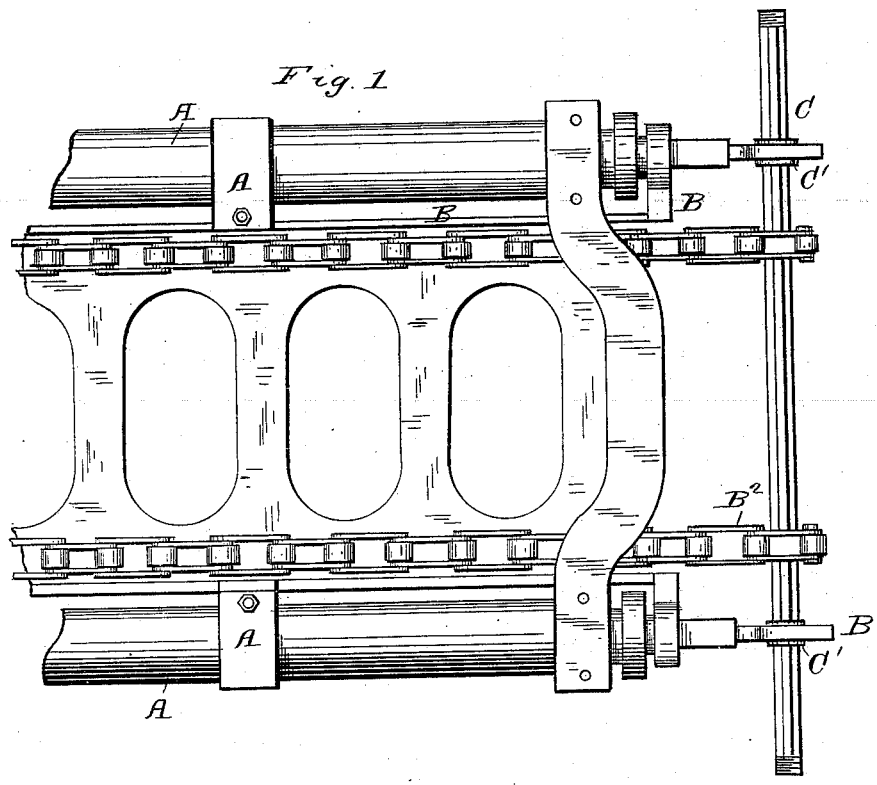
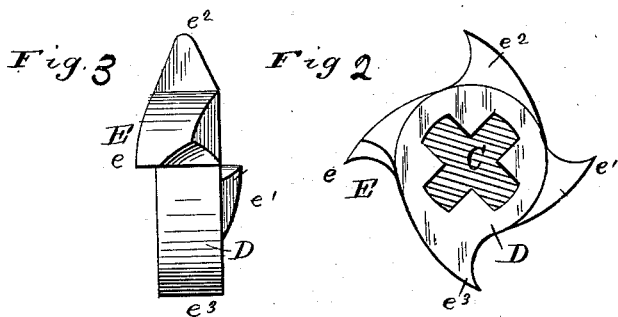
Witnesses
J. C. Turner
B. W. Sommers
Inventor:
E. S. McKinlay &
W. A. McKinlay
by Doubleday & Bliss
attys.
THE NORRIS PETERS CO., PHOTO-LITHO., WASHINGTON, D. C.

(No Model.)

E. S. & W. A. McKINLAY.
MINING MACHINE.

No. 604,192.   Patented May 17, 1898.

Witnesses
Wm. H. Edwards
Arthur L. Bryant

Inventors
E. S. McKinlay
W. A. McKinlay
By Doubleday & Bliss
Attys.

UNITED STATES PATENT OFFICE.

EDWARD S. McKINLAY AND WILLIAM A. McKINLAY, OF DENVER, COLORADO.

MINING-MACHINE.

SPECIFICATION forming part of Letters Patent No. 604,192, dated May 17, 1898.

Application filed July 17, 1886. Renewed October 21, 1897. Serial No. 655,958. (No model.)

*To all whom it may concern:*

Be it known that we, EDWARD S. MCKINLAY and WILLIAM A. MCKINLAY, citizens of the United States, residing at Denver, in the county of Arapahoe and State of Colorado, have invented certain new and useful Improvements in Mining-Machines, of which the following is a specification, reference being had therein to the accompanying drawings.

Figure 1 is a plan of a part of a mining-machine and of a cutter-bar. Fig. 2 is a cross-section of the cutter-bar, showing one of the detachable cutters in elevation. Fig. 3 is an edge view of one of the cutter-sections. Fig. 4 is a view, partly in plan and partly in section, of a portion of the cutter-bar with some of the cutter-sections attached.

A A represent the side bars of a frame, adapted to be made temporarily stationary while the operative parts are at work. B B are the side bars of the carriage which supports the cutting devices. These parts may be constructed in any of the now well-known ways or in any preferred manner. We have not illustrated any engine or motor, as these, too, can be of any suitable character. As shown, the cutter-bar C is driven by one or more chains $B^2$.

C is the bar or shaft that carries the cutters, it being illustrated as mounted in shoes D' at the front end of the carriage-bars. The cutter bar or shaft may be either circular in section or non-circular, according as cutter-washers of one form or another are employed. As shown in the drawings, the cutter-bar gives in cross-section an equal-armed cross, there being four arms. Upon this bar or shaft cutters are arranged in series, each having a washer part or hub that is a central supporting-piece D, together with one or more outwardly-extending cutters. The cutter-bar is provided with a series of these cutter washers or hubs. The teeth or cutters proper are generally indicated by E. The one at $e$ is so arranged as to cut along the plane of one of the faces of the hub, the one at $e'$ cuts along the opposite face, the one at $e^2$ cuts along the central plane, and the one at $e^3$ has a wider cutting edge, so as to effect a scraping cut over much of the surface attacked by the narrower cutters. It is often desirable to form more or less of an uneven or rough surface of the material in the path of the chisel or scraping-like cutters, as a surface of this character is much more easily cut than is the smooth and polished surface which is produced by a series of scraping-cutters one following the other and similar to each other. It will be seen that the cutting edges or points of some of the cutter sections or washers can be arranged to extend laterally into the plane of the adjacent sections or cutters, whereby one can assist another, and therefore in case one of the points should become broken or marred there will not be a stoppage of the cutting action at that line.

The series of cutters can be fastened upon the bar in any suitable way, as by nuts engaging with the threads on the ends of the bar.

The shoe B' carries a flanged bearing piece or bushing C', which has an aperture corresponding in shape to that of the cutter-bar and revolving with the latter.

Whenever it is necessary to withdraw any cutter, one of the end nuts or other fastener can be taken off and the cutter-bar withdrawn from all the washers or from as many as it is desired to remove. After new or sharpened cutters have been substituted the bar can be inserted on the line of the central apertures and be again fastened in place. As the bar is non-circular in cross-section and as the apertures in the washers are of corresponding shape the latter will be prevented from turning on the bars.

It will be seen that the bar is provided with two bearings, so that the feeding pressure can be applied uniformly to it sidewise throughout its length. The cutter-sections may be considered as made up of three series, one being between the bearings of the bar and one on each end of the bar, so that a path in the coal is formed for the latter from end to end.

We do not herein claim any of the matters claimed in our earlier application, Serial No. 124,318, filed March 15, 1884, upon which was granted Patent No. 457,887, dated August 18, 1891, preferring to claim herein only the matters incident to the cutters which we have shown and described.

What we claim is—

1. In a mining-machine, the combination with a bed or supporting-frame adapted to be made stationary, the carriage or frame to which the cutting apparatus is attached and which is movable upon the said bed to vary the position of the cutting apparatus, of the cutter-carrying shaft, the two bearings on the carriage for the ends of the shaft, the series of hubs or holders for the teeth, all of substantially the same diameter, and arranged, some between, and some outside of, the said two bearings and adapted to slide longitudinally along the shaft and the cutters secured to the said hubs and projecting therefrom, substantially as set forth whereby a cut can be produced of uniform diameter from end to end, and the shaft can be removed in either direction relatively to the cutter-hubs while they are in position, substantially as described.

2. In a mining-machine, the combination of the bed or frame adapted to be made stationary, the carriage or movable frame mounted thereon and adapted to carry the cutting apparatus, the shaft or bar secured to said carriage, for carrying the cutters, the bearings for said shaft, one at or near each end thereof, the cutter-carrying hubs situated between the said bearings and movable on the shaft longitudinally, the similar hubs at the ends of the shaft outside of the bearings, and means substantially as described for locking the hubs of the whole series against longitudinal movement along the shaft, substantially as described.

3. In a mining-machine, the combination of the bed or frame adapted to be made stationary, the sliding frame or carriage thereon, the cutting apparatus, the shaft which is non-circular in section mounted on the carriage, two bearings on the carriage for said shaft respectively at or near the ends thereof the bearing-pieces for the shaft having apertures of a cross-section corresponding to that of the shaft, the removable washers adapted to move longitudinally along the shaft, and the cutters secured thereto, said shaft being removable from the cutters which are between the bearings while the cutters remain in position substantially as described.

4. In a mining-machine, the combination of the bed or frame adapted to be made stationary, the movable carriage, the bar or shaft mounted in two bearings on the said carriage, the open hubs or washers on the said shaft adapted to move longitudinally thereon, the cutters projecting from the said washers, and the cutters on the hubs adjacent to the said bearing being arranged to project laterally to overlap the bearings and cut a path therefor, said shaft being longitudinally movable in either direction through the said hubs while they are in position substantially as described.

5. In a mining-machine, the combination of a stationary bed, as at A A, the sliding carriage, as at B, B, the shoes B' B' supported on the carriage, the cutter-bar C, supported in said shoes, one of the latter being on one side of the center, longitudinally of said bar and the other on the other side of said center, the series of cutter-carrying hubs or washers D between the said shoes and movable longitudinally along the shaft or bar C, the series of similar hubs or washers outside of each of said shoes and on said bar C, and means substantially as described for rotating said bar and with it the said hubs or washers, as set forth.

In testimony whereof we affix our signatures in presence of two witnesses.

EDWARD S. McKINLAY.
WILLIAM A. McKINLAY.

Witnesses:
JOHN S. CARY,
GEO. T. SHACKELFORD.